United States Patent
Husein et al.

(10) Patent No.: US 9,701,885 B2
(45) Date of Patent: Jul. 11, 2017

(54) USE OF NANOPARTICLES AS A LUBRICITY ADDITIVE IN WELL FLUIDS

(71) Applicant: NFLUIDS Inc., Calgary (CA)

(72) Inventors: Maen Moh'd Husein, Calgary (CA); Mohammad Ferdous Zakaria, Calgary (CA); Geir Hareland, Calgary (CA)

(73) Assignee: nFluids Inc., Calgary (CA)

( * ) Notice: Subject to any disclaimer, the term of this patent is extended or adjusted under 35 U.S.C. 154(b) by 0 days.

(21) Appl. No.: 14/377,441

(22) PCT Filed: Oct. 1, 2012

(86) PCT No.: PCT/CA2012/050688
§ 371 (c)(1),
(2) Date: Aug. 7, 2014

(87) PCT Pub. No.: WO2013/116921
PCT Pub. Date: Aug. 15, 2013

(65) Prior Publication Data
US 2015/0329762 A1    Nov. 19, 2015

(30) Foreign Application Priority Data
Feb. 9, 2012    (WO) ................ PCT/CA2012/050075

(51) Int. Cl.
*C09K 8/36*    (2006.01)
*C09K 8/04*    (2006.01)
(Continued)

(52) U.S. Cl.
CPC ................ *C09K 8/36* (2013.01); *C09K 8/032* (2013.01); *C09K 8/04* (2013.01); *C09K 8/32* (2013.01);
(Continued)

(58) Field of Classification Search
CPC ......... E21B 21/003; E21B 21/08; C09K 8/03; C09K 8/04; C09K 8/38; C09K 8/02; C09K 8/32
(Continued)

(56) References Cited

U.S. PATENT DOCUMENTS 3,622,513 A    11/1971   Miller
3,658,701 A     4/1972   McGlothlin et al.
(Continued)

FOREIGN PATENT DOCUMENTS

CA    2485777    5/2005
CA    2586832   11/2007
(Continued)

OTHER PUBLICATIONS

Nassar et al., Ultradispersed particles in heavy oil: Part I, preparation and stabilization of iron oxide/hydroxide, Sep. 17, 2009, Elsevier—Fuel Processing Tehnology, pp. 164-168.*
(Continued)

*Primary Examiner* — Silvana Runyan
(74) *Attorney, Agent, or Firm* — Fennemore Craig, P.C.

(57) ABSTRACT

A use of nanoparticles in a well fluid for improved lubricity is disclosed herein. The nanoparticles are present in the well fluid in low amounts below 5 wt %. The nanoparticles may be formed ex situ and added to the fluid or in situ in the fluid. In one aspect, the well fluid is a drilling fluid. In a further aspect, the well fluid is an invert emulsion based fluid or an aqueous based fluid.

22 Claims, 1 Drawing Sheet

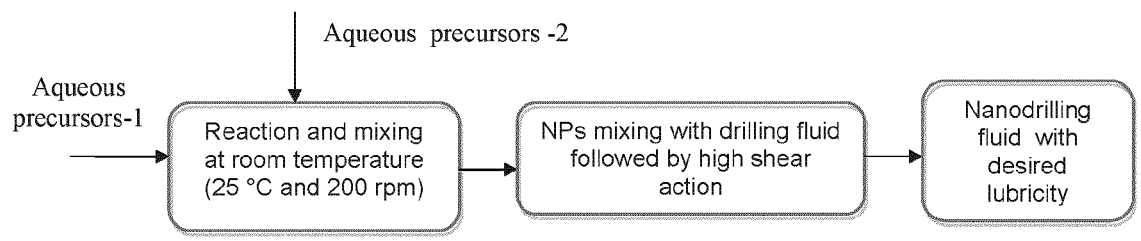

Schematic representation of the Ex-situ scheme of preparing NPs and the NPs-based drilling fluid for lubricity application

(51) Int. Cl.
C09K 8/32 (2006.01)
E21B 43/16 (2006.01)
E21B 21/06 (2006.01)
E21B 21/00 (2006.01)
C09K 8/03 (2006.01)
C09K 8/502 (2006.01)
C09K 8/504 (2006.01)

(52) U.S. Cl.
CPC ............ *C09K 8/502* (2013.01); *C09K 8/5045* (2013.01); *E21B 21/00* (2013.01); *E21B 21/062* (2013.01); *E21B 43/16* (2013.01); *C09K 2208/10* (2013.01); *C09K 2208/34* (2013.01)

(58) Field of Classification Search
USPC ...................................... 166/312, 305.1, 310
See application file for complete search history.

(56) References Cited

U.S. PATENT DOCUMENTS

| | | | |
|---|---|---|---|
| 6,579,832 | B2 | 6/2003 | Jimenez et al. |
| 6,710,020 | B2 | 3/2004 | Tenne et al. |
| 6,783,746 | B1* | 8/2004 | Zhang et al. ............. 423/447.1 |
| 6,830,695 | B1* | 12/2004 | Brady et al. .................. 210/679 |
| 7,559,369 | B2 | 7/2009 | Roddy et al. |
| 8,071,510 | B2 | 12/2011 | Scoggins et al. |
| 2002/0131923 | A1* | 9/2002 | Acton et al. ............... 422/245.1 |
| 2004/0000434 | A1* | 1/2004 | Todd et al. ...................... 175/65 |
| 2007/0161515 | A1 | 7/2007 | Bicerano |
| 2008/0234149 | A1 | 9/2008 | Malshe et al. |
| 2009/0029878 | A1 | 1/2009 | Bicerano |
| 2009/0082230 | A1 | 3/2009 | Javora et al. |
| 2009/0314549 | A1 | 12/2009 | Chenevert et al. |
| 2010/0204067 | A1 | 8/2010 | Hoskins |
| 2011/0000672 | A1 | 1/2011 | Huang |
| 2011/0059871 | A1 | 3/2011 | Tour et al. |
| 2011/0162845 | A1 | 7/2011 | Ravi et al. |
| 2011/0312857 | A1 | 12/2011 | Amanullah et al. |
| 2012/0015852 | A1* | 1/2012 | Quintero et al. ............. 507/112 |

FOREIGN PATENT DOCUMENTS

| | | |
|---|---|---|
| CA | 2663192 | 3/2008 |
| CA | 2745188 | 6/2010 |
| CA | 2755727 | 9/2010 |
| EP | 1944348 | 7/2008 |
| WO | 2007010212 | 1/2007 |
| WO | 2011054111 | 5/2011 |
| WO | 2012009128 | 1/2012 |
| WO | 2012129302 | 9/2012 |
| WO | 2013116920 | 8/2013 |

OTHER PUBLICATIONS

European Patent Application No. 12867972.7, Search Report dated Sep. 10, 2015.
Australian Patent Application No. 2012369545, Examination Report dated Sep. 15, 2015.
European Patent Application No. 13813096.5, Search Report dated Nov. 5, 2015.
Australian Patent Application No. 2012369546, Examination Report dated Oct. 22, 2015.
U.S. Appl. No. 14/377,438, Restriction Requirement dated Nov. 13, 2015.
Agarwal et al., "Flow Behavior of Nanoparticle Stabilized Drilling Fluids and Effect of High Temperature Aging", AADE-11-NTCE-3, 2011 AADE National Technical Conference and Exhibition, Houston, Texas, Apr. 12-14, 2011, pp. 1-6.
Abdullah et al., "Tribological Behaviour of OA-Capped WO3 Nanoparticles as an Additive to Base Oils", Sains Malaysiana, Sep. 2008, vol. 37, No. 3, pp. 227-232.

Verma et al., "Tribological Behavior of Deagglomerated Active Inorganic Nanoparticles for Advanced Lubrication", Tribology Transactions, Oct. 2008, vol. 51, pp. 673-678.
Alberty et al., "A Physical Model for Stress Cages", SPE Annual Technical Conference and Exhibition, Houston, Texas, Sep. 26-29, 2004, pp. 1-8.
Amanullah et al., "Nano-Technology—Its Significance in Smart Fluid Development for Oil and Gas Field Application", SPE 126102, SPE Saudi Arabia Section Technical Symposium and Exhibition, Alkhobar, Saudi Arabia, May 9-11, 2009, 12 pages.
Amanullah et al., "Preliminary Test Results of Nano-Based Drilling Fluids for Oil and Gas Field Application", SPE/IADC 139534, SPE/IADC Drilling Conference and Exhibition, Amsterdam, Netherlands, Mar. 1-3, 2011, pp. 1-9.
Aston et al., "Towards Zero Fluid Loss Oil Based Muds", SPE 77446, SPE Annual Technical Conference and Exhibition, San Antonio, Texas, Sep. 29-Oct. 2, 2002, pp. 1-9.
Bumajdad et al., "Characterization of iron hydroxide/oxide nanoparticles prepared in microemulsions stabilized with cationic/non-ionic surfactant mixtures", Journal of Colloid and Interface Science, Mar. 2011, vol. 355, pp. 282-292.
Cai et al., "Synthesis and Anion Exchange of Tunnel Structure Akaganeite", Chem. Mater, Nov. 1, 2001, vol. 13, pp. 4595-4602.
Canter, "Boron Nanotechnology-Based Lubricant Additive", Tribology & Lubrication Technology, Aug. 2009, pp. 6-7.
Dupriest, "Fracture Closure Stress (FCS) and Lost Returns Practices", SPE/IADC, SPE/IADC 92192 Drilling Conference, Amsterdam, The Netherlands, Feb. 23-25, 2005, pp. 1-11.
Fjelde, "Formation Damages Causes by Emulsions During Drilling with Emulsified Drilling Fluids", SPE 105858, SPE International Symposium on Oilfield Chemistry, Houston, Texas, Feb. 28-Mar. 2, 2007, pp. 1-8.
Guthrie et al., "Novel Fluids for Deep Oil and Gas Drilling", The Energy Lab, Project Summary, Complementary Research Program under Subtitle J, Section 999 of the Energy Policy Act of 2005, 2 pages.
Husein et al., "Nanoparticle Preparation Using the Single Microemulsions Scheme", Current Nanoscience, Nov. 2008, vol. 4, pp. 370-380.
International Patent Application No. PCT/CA2012/050075, International Preliminary Report on Patentability dated Aug. 12, 2014.
International Patent Application No. PCT/CA2012/050075, International Search Report and Written Opinion dated Jul. 16, 2012.
International Patent Application No. PCT/CA2012/050688, International Preliminary Report on Patentability, Aug. 12, 2014.
International Patent Application No. PCT/CA2012/050688, International Search Report and Written Opinion dated Dec. 21, 2012.
International Patent Application No. PCT/CA2013/050532, International Preliminary Report on Patentability dated Jan. 13, 2015.
International Patent Application No. PCT/CA2012/050688, International Search Report and Written Opinion dated Oct. 2, 2013.
Ke et al., "Lubricity of Brine Completion and Workover Fluids", SPE 130679, SPE/ICoTA Coiled Tubing and Well Intervention Conference and Exhibition, The Woodlands, Texas, Mar. 23-24, 2010, pp. 1-7.
Kercheville et al., "Comparison of Environmentally Acceptable Materials With Diesel Oil for Drilling Mud Lubricity and Spotting Fluid Formulations", IADC/SPE 14797, IADC/SPE Drilling Conference, Dallas, Texas, Feb. 10-12, 1986, pp. 1-5.
Kokal, "Crude-Oil Emulsions: A State-of-the-Art Review", SPE Productions & Facilities, Society of Petroleum Engineers, Feb. 2005, pp. 5-13.
Kostic, "Development of Hybrid, Tribological Nanofluids with Enhanced Lubrication and Surface-Wear Properties", Department of Mechanical Engineering, Northern Illinois University, Mar. 27, 2015, pp. 1-3.
Kumar et al., "Wellbore Strenghtening: The Less-Studied Properties of Lost-Circulation Materials", SPE 133484, SPE Annual Technical Conference and Exhibition, Florence, Italy, Sep. 19-22, 2010, pp. 1-13.
Lal et al., "Adsorption/desorption properties of copper ions on the surface of iron-coated sand using BET and EDAX analyses", Chemosphere, Oct. 2000, vol. 41, pp. 1249-1255.

(56) References Cited

OTHER PUBLICATIONS

Lammons, "Field use documents glass-bead performance", Technology, Oil & Gas Journal, Nov. 26, 1984, pp. 109-111.
Lee et al., "AADE 2009NTCE-18-04: Use of magnetic nanoparticles for smart drilling fluids", 2009 National Technical Conference & Exhibition, New Orleans, Louisiana, pp. 1-5.
Morita et al., "Theory of Lost Circulation Pressure", SPE 20409, 65th Annual Technical Conference and Exhibition of the Society of Petroleum Engineers, New Orleans, Louisiana, Sep. 23-26, 1990, pp. 43-58.
Moshkovith et al., "Sedimentation of IF-WS2 aggregates and a reproducibility of the tribological data", Science Direct, Tribology International, Jan. 2007, vol. 40, pp. 117-124.
Mosleh et al., "Modification of sheet metal forming fluids with dispersed nanoparticles for improved lubrication", Wear, Jun. 15, 2009, vol. 267, pp. 1220-1225.
Nassar et al., "Study and Modeling of Iron Hydroxide Nanoparticle Uptake by AOT (w/o) Microemulsions", Langmuir, Dec. 2007, vol. 23, pp. 13093-13103.
Nassar et al., "Preparation of iron oxide nanoparticles from FeCI3 solid powder using microemulsions", phys. stat. sol. (a), Apr. 2006, vol. 203, No. 6, pp. 1324-1328.
Newman et al., "AADE 2009-NTCE-08-02: Advances in Mixing Technology Improve Drilling Fluid Preparation and Properties", 2009 National Technical Conference & Exhibition, New Orleans, Louisiana, pp. 1-5.
"Q'Max Technical Bulletin #7, Differentially Stuck Pipe", QMAX Solutions Inc., 3 pages.
Salehi et al., "Evaluation of New Drilling Approach for Widening Operational Window: Implications for Wellbore Strengthening", SPE 140753, SPE Production and Operations Symposium, Oklahoma City, Oklahoma, Mar. 27-29, 2011, pp. 1-16.
Sensoy et al., "Minimizing Water Invasion in Shale Using Nanoparticles", SPE 124429, SPE Annual Technical Conference and Exhibition, New Orleans, Louisiana, Oct. 4-7, 2009, pp. 1-16.
Sensoy, "Use of Nanoparticles for Maintaining Shale Stability", Thesis Presented to the Faculty of the Graduate School of The University of Texas at Austin, May 2009, 93 pages.
Skalle et al., "Microbeads as Lubricant in Drilling Muds Using a Modified Lubricity Tester", SPE 56562, 1999 SPE Annual Technical Conference and Exhibition, Houston, Texas, Oct. 3-6, 1999, pp. 1-7.
Song et al., "Preventing Mud Losses by Wellbore Strengthening", SPE 101593, 2006 SPE Russian Oil and Gas Technical Conference and Exhibition, Moscow, Russia, Oct. 3-6, 2006, pp. 1-3.
Srivatsa et al., "An Experimental Investigation on use of Nanoparticles as Fluid Loss Additives in a Surfactant—Polymer Based Drilling Fluid", IPTC 14952, International Petroleum Technology Conference, Bangkok, Thailand, Feb. 7-9, 2012, pp. 1-19.
Riley et al., "Wellbore Stability in Unconventional Shale—The Design of a Nano-particle Fluid", SPE 153729, SPE Oil and Gas India Conference and Exhibition, Mumbai, India, Mar. 28-30, 2012, pp. 1-8.
Streat et al., "Hydrous ferric oxide as an adsorbent in water treatment Part 1. Preparation and physical characterization", Science Direct, Process Safety and Environmental Protection, Jan. 2008, vol. 86, pp. 1-9.
Vahidreza et al., "Experimental Analysis and Mechanistic Modeling of Wellbore Strengtening", University of Calgary. A Thesis, Department of Chemical and Petroleum Engineering, Calgary, Alberta, Dec. 2011, 182 pages. (4 Parts).
Wang et al., "Strengthening a Wellbore with Multiple Fractures: Further Investigation of Factors for Strengthening a Wellbore", ARMA 09-67, the 43rd US Rock Mechanisms Symposium and 4th U.S.-Canada Rock Mechanics Symposium, Asheville, North Carolina, Jun. 28-Jul. 1, 2009, 9 pages.
Wu et al., "Experimental analysis of tribological properties of lubricating oils with nanoparticle additives", Science Direct, Wear, Mar. 2007, vol. 262, pp. 819-825.
Yang et al., "Research and Application of Nanoscale Emulsion Lubricating Material for Drilling Fluid in Daqing Oil Field", IADC/SPE 161899, Asia Pacific Drilling Technology Conference and Exhibition, Tianjin, China, Jul. 9-11, 2012, pp. 1-7.
Zakaria et al., "Examining How Selecting the Right Drilling Fluids/ Muds Can Extend the Reach of Horizontal Wells, Decrease Fluid Losses and Increase Wellbore Strength: The Application of Nanoparticles", Horizontal Drilling, Tight Oil Plays Conference, Jun. 2012, University of Calgary, 37 pages.
Chang et al., "Enhancement effect of nanoparticles on the sliding wear of short fiber-reinforced polymer composites: A critical discussion of wear mechanisms", Tribology International, Dec. 2010, vol. 43, pp. 2355-2364.
Zakaria et al., "Novel Nanoparticle-Based Drilling Fluid with Improved Characteristics", SPE 156992, SPE International Oilfield Nanotechnology Conference, Noordwijk, The Netherlands, Jun. 12-14, 2012, pp. 1-6.
Zhang et al., "Performance and anti-wear mechanism of CaCO3 nanoparticles as a green additive on poly-aplha-olefin", Tribology International, Feb. 2009, vol. 42, pp. 1029-1039.
Aston et al., "Drilling Fluids for Wellbore Strengthening", IADC/ SPE 87130, IADC/SPE Drilling Conference, Dallas, Texas, Mar. 2-4, 2004, pp. 1-8.
Australian Application No. 2013289816, Examination Report dated Jan. 19, 2016.
Cloisite 30B Product Specification—Neutrino [retrieved from the internet Jan. 14, 2016], URL: http://www.neunano.com/index.php?option=com_content&view=article&id=72Itemid=83>, 2 pages.
Bitumexport: Additives and materials for asphalt and water proofing [retrieved from the internet Jan. 14, 2016], URL: http://bitumexport.weebly.com/drilling-gilsonite.html>, 2 pages.
Australian Patent Application No. 2012369546, Examination Report Dated Apr. 14, 2016.
Mohapatra, M., et al. "Synthesis and applications of nano-structured iron oxides/hydroxides—a review", International Journal of Engineering, Science and Technology, vol. 2, No. 8, Accepted for Publication Nov. 2010, pp. 127-146.

\* cited by examiner

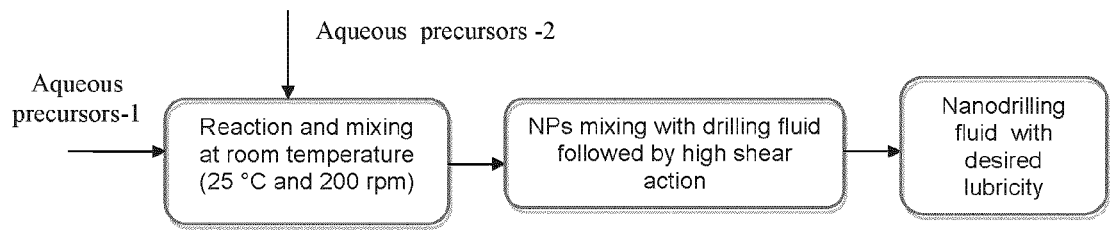

Figure 1 : Schematic representation of the Ex-situ scheme of preparing NPs and the NPs-based drilling fluid for lubricity application

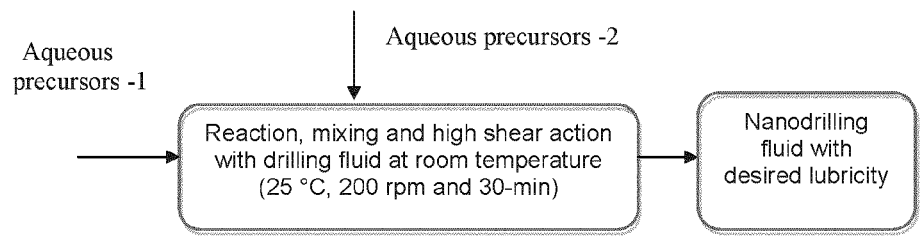

Figure 2 : Schematic representation of the In-situ scheme of preparing NPs and the NPs-based drilling fluid lubricity application

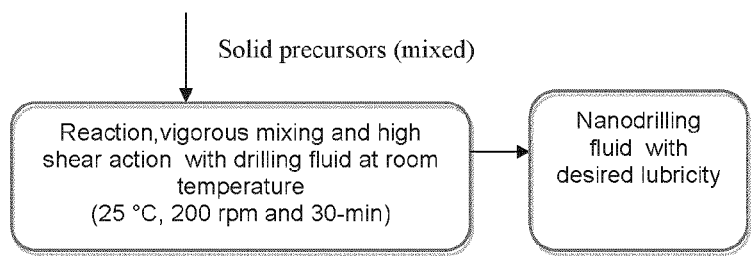

Figure 3 : Schematic representation of the In-situ scheme of preparing non-aqueous solid NPs and the NPs-based drilling fluid lubricity application

USE OF NANOPARTICLES AS A LUBRICITY ADDITIVE IN WELL FLUIDS

CROSS-REFERENCE TO RELATED APPLICATIONS

This application is a U.S. National Entry of PCT Patent Application No. PCT/CA2012/050688, filed Oct. 1, 2012, which claims the benefit of priority of PCT Patent Application No. PCT/CA2012/050075, filed Feb. 9, 2012, which is incorporated herein by reference.

FIELD

The present disclosure relates generally to well fluids with nanoparticles as lubricity additives for improving lubricity, increased rate of penetration, and/or decreasing wellbore friction. In one aspect, the well fluid is drilling fluid used during drilling of underground formations.

BACKGROUND

Friction dissipates energy and causes wear resulting in damage to the equipment. The way to ensure that frictional effects are minimized is through proper lubrication. In carrying out this function, lubricants create a lubricant film on surfaces of moving parts. Lubricant additives can be used in automobiles, lubricants, greases, metal working fluids, oil and gas drilling, heavy machinery and other related industries.

The type of drilling fluids chosen for a given drilling operation depends on the formation being drilled, the depth, the mechanical resistance, and the pressure of the wellbore. Regardless of their type, drilling fluids maintain hole integrity, remove cuttings from the hole, prevent formation damage, suspend cuttings and weighting materials when circulation is stopped, cake off the permeable formation by preventing the passage of fluid into the formation, and cool down and lubricate the drill bit.

Even if a drilling fluid successfully meets all of the above requirements, there is no guarantee that the rate of penetration will be acceptable, since poor lubricity and high friction and drag increase pipe sticking and drilling cycle. The need to overcoming frictional forces is very much encountered during all stages of wells construction; including drilling, completion and maintenance, which originates from the rotation and/or sliding of a pipe inside the well in contact with either the wellbore (metal-to-rock) or the casing (metal-to-metal). These forces hinder directional and extended reach drilling by creating excessive torque and drag. Excessive torque and drag in highly directional and extended-reach wells can exceed the mechanical limits of the drilling equipment, which may expedite wear and tear of down hole tools and equipment and thereby limit production. These problems can be minimized by using drilling fluid with high capabilities of lubricating the different components.

Historically, oil-based products have been used as lubricants for the drilling operations. However, recent environmental regulations limit the usage of aromatic-based oil and require the adaptation of mineral oil, synthetic oil and water based mud where lubricant additives are found useful to increase the lubricity (Riley et al., 2012; Kercheville et al. 1986). In these instances, lubrication is achieved using additives such as liquid lubricants, including glycols, oils, esters, fatty acid esters, surfactants and polymer-based lubricants; and solid lubricants, such as graphite, calcium carbonate flakes, glass and plastic beads (Hoskins, 2010; Skalle et al., 1999). The main function of these additives is to lubricate the drill string and prevent differential sticking. But these available lubricants have not proven entirely effective and suffer from different disadvantages. Both liquid and large sized solid lubricants can cause permanent damage to the formation (Hoskins, 2010; Skalle et al., 1999; Lammons, 1984). Furthermore, micro and macro sized solid lubricants can interfere with drilling equipment and hinder production. The abrasive nature of macro and/or micro sized solid lubricants may cause higher kinetic energy and accelerate or aggravate the wear and tear of the downhole equipment (Amanullah et al., 2011). Some of these solids, nevertheless, get filtered out in the solids control equipment due to their large size and are, therefore, less problematic. Liquid lubricants can also negatively impact the physical and chemical properties of the drilling fluid and lead to foaming (Hoskins, 2010). To counter foaming, costly defoamers must be added to the system. Liquid lubricants form a film between two surfaces and, hence, minimize frequent contact and consequently friction. However, their efficiency largely depends on mud type and may depreciate in the presence of other types of mud additives. It should also be noted that the efficiency of liquid lubricants is entirely lost in high-solids muds. Solid lubricants, on the other hand, do not depreciate as much in such muds (Hoskins, 2010; Skalle et al., 1999). However, these materials are not sufficiently effective to serve their primary goals of reducing the coefficient of friction.

By virtue of their very small sizes, nanoparticles (NPs) have the potential of acting as effective lubricant additives. Their size and shape enable them to enter contact zones between surfaces easily. Inorganic nanoparticles mostly do not display any affinity to oil and may not be affected by the mud type. In-situ and ex-situ techniques for forming a wide variety of well dispersed NPs in an invert emulsion as well as water-based drilling fluid have been detailed in the art (Husein et al., 2012). These methods rely heavily on high shearing, which produces finely dispersed water pools, in the case of invert emulsion drilling fluids, and the use of these water pools as nanoreactors to form NPs with sizes mainly below 100 nm. Once formed, these NPs display very high stability in the mother drilling fluid and interact very effectively with the rest of the drilling fluid (Husein et al., 2012). Previous experiments showed that these particles perfectly seal filter cakes by creating crack-free, very smooth surfaces (Husein et al., 2012). Therefore, these particles contribute to the formation of slippery layers between the borehole and the drill string leading to lower overall friction coefficient and, subsequently, increase the extended reach of horizontal drilling. Moreover, due to the small sizes of these particles, the wear and tear of down hole equipment and tools becomes negligible as less kinetic energy (nano sized particles achieve lower sedimentation speed compare to the large sized particles) and abrasive action is encountered. Overall, the application of nanoparticles in drilling fluid presents a good potential for reducing friction while drilling and, hence, improve the extended reach.

Nanoparticles and nano-emulsion particularly have previously been used in drilling fluids and hydrocarbons for a variety of purposes.

U.S. Patent 20080234149 A1 (2008) is directed to a nanoparticles-based lubricant composed of solid lubricant nano-material (material selected from molybdenum disulphide, tungsten disulphide, gold, silver, lead and tin) having a size less than or equal to 500 nm and a second material which is a chemical surface active agent placed on an external surface of the nanoparticles to minimize particles agglomeration. The nanoparticle preparation protocol is not straight forward and involves many steps, which makes the approach commercially unattractive. This patent does not describe the use of the product particles in drilling fluids, and does not refer to the use of ferric hydroxide and calcium carbonate nanoparticles.

U.S. Pat. No. 6,710,020 (2004) discloses the application of hollow-inorganic fullerene (IF) nanoparticles as a lubricating additive for automotive transport applications. IF nanoparticles having diameters between 10 and 200 nm are slowly released to the surface from its base metal to provide lubrication. These nano-materials are synthesized in a fluidized bed reactor at 850° C. and require different cleaning and purification steps before they could be used. This technique of nanoparticle preparation produces particles with high surface activity, which tends to bind the particles together and limits the quantity of nanoparticles produced. This patent does not include measurements of friction coefficient of drilling fluids.

U.S. Patent 2011/162845 discloses a method of servicing a wellbore. It introduces a lost circulation composition into a lost circulation zone to reduce the loss of fluid into the formation. The lost circulation composition comprises Portland cement in an amount of about 10 wt % to about 20 wt % of the lost circulation composition, 1 to 100 nm nanosilica of 0.5 wt % to 4 wt %, 5 wt % to 10 wt % amorphous silica, 0.5 wt % to 2 wt % synthetic clay, 15 wt % to 50 wt % sub-micron sized calcium carbonate and 60 wt % to 75 wt % water. The lost circulation compositions rapidly developed static gel strength and remained pumpable for at least about 1 day. The sample was observed to gel while static but returned to liquid upon application of shear. This patent only shows the effectiveness in terms of lost circulation control by nano-materials and does not provide any data on friction coefficient of the drilling fluid.

U.S. Patent Application 2009/82230 (2009) relates to an aqueous-based well treatment fluid, including drilling fluids, containing a viscosifying additive. The additive has calcium carbonate nanoparticles with a median particle size of less than or equal to 1 µm. The amount of calcium carbonate nanoparticles used in the drilling fluid is approximately 20 wt %. The nanoparticles used in the well treatment fluid were capable of being suspended in the fluid without the aid of a polymeric viscosifying agent. The addition of nanoparticles altered the viscosity of the fluid. Nanoparticles suspended in a well treatment fluid exhibited sagging (inadequate suspension properties) particularly at high temperatures of around 350° F. The viscosity changes of a fluid upon addition of nanoparticles were well reported. However, even with the high amount of nanoparticles added to the fluid formulation, no fluid loss and lubricity data were reported.

U.S. Pat. No. 8,071,510 (2011) is directed to a method of increasing the lubricity or reducing the coefficient of friction of a drilling or completion fluid by using brine of at least one water soluble salt, vegetable oil and an anionic or non-ionic surfactant in order to assist in the solubilization of the salt. This patent does not describe the use of the nanoparticles for reducing the coefficient of friction. Further, the present inventors have found that sodium salts have a negative impact on lubricity quality, as set out below.

Yang et al. (2012) developed a nanoscale emulsion lubricating material to solve the high friction drag in drilling operation. It increased lubricity by 50 wt %, but did not improve fluid loss and viscosity property. Their work did not involve nanoparticles.

Riley et al. (2012) studied the addition of silica-based nanoparticles in drilling fluid and reported 20% lower coefficient of friction upon applying 150 lb/lbs of torque.

Other references, such as Amanullah et al. 2011, consider the use of small amounts of nanoparticles in water and indicate the potential for beneficial effects on differential sticking, torque reduction and reduction of drag problems in certain types of drilling. However, these references experiment with nanoparticles in water and require very active stabilizers to maintain the nanoparticle dispersions or look at the interaction of nanoparticles with other components that may be present in a well fluid. The references do not provide data directly relevant to lubricity results in industrial drilling fluids but merely indicate further areas for research.

It is, therefore, desirable to provide an improved drilling fluid having a decreased coefficient of friction.

SUMMARY

It is an object of the present disclosure to obviate or mitigate at least one disadvantage of previous fluids.

The present disclosure is directed to nanoparticles for use in well fluids, and in one aspect, drilling fluids, as a lubricity additive to reduce friction and increase lubricity. The lubricity additive will reduce the co-efficient of friction at a given torque.

In one aspect, the nanoparticles are hydroxide, and/or carbonate nanoparticles. The nanoparticles are present in the fluid in low amounts. The nanoparticles are present in amounts of less than 5 wt %, and may be present in amounts between 0.1 wt % and 4 wt %, and in a further aspect between 1 wt % and 4 wt %. As a result, the nanoparticles do not significantly alter the other characteristics of the fluid.

In one aspect, the nanoparticles useful as a lubricity additive are formed ex situ and added to the well fluid or formed in situ in the fluid.

In a further aspect, the nanoparticles are formed ex situ, by providing aqueous-based precursor solutions for forming the nanoparticles, mixing the precursor solutions under high shear, and adding the mixed product suspension to the well fluid under high shear to form the nanoparticle-containing well fluid, wherein the nanoparticles act as a lubricity additive.

In a further aspect, the nanoparticles are formed in situ, by providing aqueous-based precursor solutions for forming the nanoparticles, adding the precursor solutions successively to the well fluid, and subjecting the fluid to mixing and shearing to form the nanoparticles in the fluid, wherein the nanoparticles act as lubricity additive.

In another aspect, the nanoparticles are formed in situ, comprising the steps of providing the solid precursor for forming the nanoparticles, adding the precursors successively or simultaneously to the well fluid, and subjecting the fluid to mixing and shearing to form the nanoparticles in the fluid, wherein the nanoparticles act as lubricity additive.

Other aspects and features of the present disclosure will become apparent to those ordinarily skilled in the art upon review of the following description of specific aspects in conjunction with the accompanying figures.

BRIEF DESCRIPTION OF THE DRAWINGS

Aspects of the present disclosure will now be described, by way of example only, with reference to the attached Figures.

FIG. 1 is a schematic diagram of the procedure used to make the nanoparticles ex situ.

FIG. 2 is a schematic diagram of the procedure used to make the nanoparticles in situ.

FIG. 3 is a schematic diagram of a further procedure used to make the nanoparticles in situ.

DETAILED DESCRIPTION

Generally, the present disclosure provides a use of nanoparticles as a lubricity additive in a well fluid, and, in one aspect, in a drilling fluid. The lubricity additive reduces the friction and increases lubricity.

The nanoparticle-containing fluids have one or more of the following advantages. The nanoparticles act as a lubricity additive to reduce the coefficient of friction as compared to fluids without the nanoparticles. The nanoparticles form a thin, slippery and firm filter cake in the formation which can help reduce fluid loss that causes minimal formation damage. They result in less torque and drag. Also, particles that are embedded in the wall cake provide a load-bearing surface between pipe and therefore increasing extended reach wells, deviated and horizontal drilling. Nanoparticles will also pass the solids control equipment unspoiled. They are stable at extremely high temperatures. The nanoparticles are present in the fluids at low concentrations and may be used without other lubricant materials. The low concentration results in less formation damage, no significant change to the characteristic of the fluid and an increase in productivity index. The nanoparticles can be formed ex situ and added to the fluid or formed in situ in the fluid. This results in time and cost savings.

The well fluid can be any fluid that is pumped in pipes or flows through a formation. Any such fluid needs to display low friction, otherwise pumping costs will be significant. In particular, the well fluid is a kill fluid, completion fluid, pre-stimulation fluid or drilling fluid. In one aspect, it is a drilling fluid. Although this disclosure describes the fluid as a drilling fluid, a skilled person will understand that the nanoparticles may be used as a lubricity additive in any well fluid.

In one aspect, the well fluids are aqueous-based or invert emulsion fluids. Hydrocarbon based emulsions contain a large amount, i.e. 95 vol %, hydrocarbon based material (oil) as the continuous phase of the emulsion. The remainder of the emulsion is a minor amount of an aqueous phase as the discontinuous phase of the emulsion.

The well fluids, and in one aspect drilling fluids, may contain a number of common additives such as weighting agents, emulsifiers, surfactants, foaming agents, surfactants, etc. The nanoparticles and their concentrations are selected such that they do not affect the other characteristics of the fluid.

In one aspect, the nanoparticles are selected from metal hydroxides, e.g. iron hydroxide, metal carbonates, e.g. calcium carbonate. These particles may act as lost circulation material in addition to lubricity additive.

The synthesis of the nanoparticles (NPs) additive is a chemo-mechanical process. The unique process enables finely disperse NPs formation in the water-in-oil based fluids (invert emulsion fluids) as well as water-based fluids. As a result, the NPs can be easily inserted into the current lubricant system. The severity of the drilling process, nevertheless, may induce particle agglomeration. However, the surfactants existing in drilling fluid would act as stabilizers and would limit agglomeration through steric hindrance. In one aspect, the nanoparticles have a particle size in the range of 1 to 120 nm and in a further aspect the majority or most of the nanoparticles have a particle size in the range of 1 to 30 nm. In a further aspect, substantially all of the nanoparticles have a particle size is the range of 1 to 30 nm.

Nanoparticles based lubricant additive is prepared through a proprietary manufacturing process according to Zakaria et al. (2012) and Husein et al. (2012).

Lubricants play an important role in reducing friction and wear and preventing component failure. Economically affordable nanoparticles are combined with the invert emulsion well fluids or water-based well fluids to achieve the desired lubricity property. Characterization of the nanoparticles is accomplished through powder X-ray diffraction patterns (XRD), energy dispersive X-ray (EDX), scanning electron microscopy (SEM) and transmission electron microscopy (TEM). The results for drilling fluids are disclosed in PCT/CA2012/50075 (Husein et al., 2012). NPs are able to stop the intrusion of fluid into the formation as well as increase the lubricity during drilling.

NP-based lubricants are nanosized solid particles, which are chemically and physically stable. Under the conditions of load and temperature resulting from the contacting surfaces, these NPs furnish a thin film of lubricant layer on the contacting surfaces leading to reduced friction between the surfaces. The lubrication effect is influenced by the hydrodynamic properties of the fluid and the size of the NPs.

The drilling fluid transports the solid lubricant NPs to the contacting surfaces.

In a further aspect of the disclosure, the nanoparticles in the fluid can be made using either in situ or ex situ techniques. The in situ technique is preferred.

The NPs can be formed in situ in the well fluid. This eliminates the handling and agglomeration problems present with many commercial prepared nanoparticles. In this method, aqueous precursors of the NPs are added to the well fluid and mixed thoroughly. High shear is applied to the well fluid to ensure intimate mixing for the formation of stable ultradispersed NPs in the well fluid. The stability of the resultant NPs hinges upon particle size.

In another aspect, the in situ NPs are prepared by directly adding the solid precursors into the well fluid coupled with intensive mixing and shearing. One needs to ensure that the volume and chemical composition of the innate water in the well fluid allows for complete dissolution of the precursors.

In the ex situ process, the NPs are pre-prepared from their precursors. Precursors, in one aspect aqueous precursor solutions, are mixed under high shearing. The resultant NPs are then added to the well fluid under high mixing and shearing.

The mixing and shearing needed for NPs formation may easily be made available on an oil rig. Special in-line mixers or shearing available from the high pressure pump should provide the needed mixing. Experimental results showed that 1 wt % of Fe(OH)$_3$ or 4 wt % of CaCO$_3$ NPs induce appreciable reduction in the coefficient of friction. Moreover, at the level of NPs added, no impact on drilling fluid specific gravity, apparent viscosity and pH was observed.

1. Drilling Fluid Samples

The invert emulsion was supplied by a Calgary based drilling fluid company. One mix of the drilling fluid namely, 90 oil: 10 water (V/V) was tested. The composition of the invert emulsion drilling fluid is shown in Table 1.

TABLE 1

Compositions of drilling fluid samples

Oil:water (V/V) = 90:10
Base Oil = Low-aromatic hydrotreated oil

TABLE 1-continued

Compositions of drilling fluid samples

Brine = 30% Calcium Chloride
Organophillic Clays = 15 kg/m3
Hot Lime = 35 kg/m3
Primary Emulsifier = 10 L/m3
Secondary Emulsifier = 5 L/m3

The NP concentration was maintained at 1 wt % and 4 wt % for the in situ and ex situ prepared $Fe(OH)_3$ and $CaCO_3$ particles, respectively.

2. Preparation of Iron (III) Hydroxide and Calcium Carbonate NPs and the NP-based Drilling Fluid Iron (III) Hydroxide NPs:

Iron (III) hydroxide NPs were prepared by aqueous reaction between $FeCl_3$ and NaOH at specified temperature and rate of mixing as per the following reaction.

$$FeCl_{3(aq)} + 3NaOH_{(aq)} \rightarrow Fe(OH)_{3(s)} + 3NaCl_{(aq)} \quad (R1)$$

Ex situ preparation: Iron hydroxide NPs were prepared by first solubilizing specific amount of anhydrous iron (III) chloride powder (laboratory grade, Fisher Scientific Company, Toronto, ON, Canada) in 2 mL deionized water to give final concentration of 2.5 M followed by addition of a stoichiometric amount of $NaOH_{(s)}$ pellets (Fisher Scientific Company, Toronto, ON, Canada) under 200 rpm of mixing and 25° C. The color of the aqueous solution turned reddish brown signaling the formation of precipitate of $Fe(OH)_{3(s)}$.

The particles were mixed with the invert emulsion drilling fluid in a slurry form. The fluids were mixed/highly sheared to achieve a homogenous mixture using Hamilton beach mixer. FIG. 1 shows a schematic drawing of the experimental procedure.

In situ preparation: This scheme of nanoparticle synthesis followed the two microemulsion method for nanoparticle synthesis (Husein and Nassar, 2008). A 1 mL of 5 M $FeCl_{3(aq)}$ was added to 250 mL of the drilling fluid, and in a separate vial 1 mL of 16 M $NaOH_{(aq)}$ was added to 250 mL of the drilling fluid. The two vials were mixed overnight at 200 rpm and 25° C. Two control samples were prepared one containing the $FeCl_{3(aq)}$ in the drilling fluid and another containing the $NaOH_{(aq)}$ in the drilling fluid and the samples were left to mix overnight at 200 rpm and 25° C. Finally to achieve a homogenous mixture of the fluid samples and disperse the NPs more effectively, Hamilton beach mixer was used. FIG. 2 shows a schematic drawing of the experimental procedure.

In another aspect, in situ NPs were prepared by adding the solid precursors of $FeCl_3$ and NaOH at the stoichiometric ratio in small batches directly into the drilling fluid under high mixing and shearing. The water pools of the invert emulsion solubilize the solid precursors, and once solubilized, precursors react to form the solid product. The size of the $Fe(OH)_3$ product remains in the nano domain by virtue of the limited size of the water pool, which, in turn, is preserved by the surrounding layer of surfactant molecules. FIG. 3 is a schematic representation of the process.

Calcium Carbonate Nanoparticles:

Calcium Carbonate NPs were prepared by aqueous reaction between $Ca(NO_3)_2$ and $Na_2CO_3$ at specified temperature and rate of mixing as per the following reaction (R2).

$$Ca(NO_3)_{2(aq)} + Na_2CO_{3(aq)} \rightarrow CaCO_{3(s)} + 2NaNO_{3(aq)} \quad (R2)$$

Ex situ preparation: Calcium carbonate NPs were prepared by first solubilizing specific amount of anhydrous sodium carbonate powder in 5 mL deionized water to give a final concentration of 2.26 M followed by addition of 1 mL of 7.6 M stoichiometric amount of aqueous calcium nitrate under 200 rpm of mixing at 25° C. The color of the aqueous solution turned white signaling the formation of precipitate of $CaCO_{3(s)}$ as per reaction (R2). FIG. 1 shows a schematic drawing of the experimental procedure. The product NP-slurry was mixed with the drilling fluid under high mixing and shearing using Hamilton beach mixer.

In situ preparation: A 5 mL of 2.2 M sodium carbonate was added to 250 mL of the drilling fluid and in a separate vial 1 mL of 7.6 M aqueous calcium nitrate was added to 250 mL of the drilling fluid. The samples were left to mix overnight at 200 rpm and 25° C. Finally to achieve a homogenous mixture of the fluid samples and disperse the NPs more effectively, Hamilton beach mixer was used. FIG. 2 shows a schematic drawing of the experimental procedure.

3. Lubricity Testing Method

A functional (drilling fluid lubricity) test was designed to simulate the torque and drag produced by a given drilling fluid.

The lubricity test was designed to simulate the speed of rotation of the drill pipe and the pressure the pipe bears against the wall of the bore hole (OFITE lubricity test manual, 2011). It also predicts the wear rates of mechanical parts in known fluid systems. Lubricity property of the drilling fluid with NPs was evaluated by OFITE Lubricity Tester (Part no: 111-00, serial: 07-09, Houston, Tex.) at 150 inch-pounds of torque which were applied to two hardened steel surfaces, a block and ring rotating at 60 rpm rotational speed. The test sample was completely immersed between the ring and block. The apparatus ran for 5 min in order to coat the metal test pieces with the sample fluid. The torque adjustment handle was then turned until 150 inch-pounds of torque had been applied to the test block. The machine again ran a 5 min stabilization period. A friction coefficient reading was then taken. Additional readings were taken every 5 min until three consecutive readings agreed within ±2 units. The experiments involved three replicates and the 95% confidence interval in Table 2 and Table 3 show high reproducibility of the test results.

The drilling fluid lubricity coefficient can be calculated using the following equation as given in the Ofite manual (Ofite lubricity tester manual, 2011):

$$\text{Coefficient of friction} = \frac{\text{lb force to turn the ring}}{\text{lb torque load applied}} = \frac{\text{Meter Reading}}{100} \quad (E1)$$

Coefficient of Friction (CoF) is used to quantify how readily two surfaces slide in the presence of a lubricant or oil. It is a key factor which directly affects the torque and drag. The lower the value of the coefficient of friction, the higher the lubricity or vice-versa.

The torque reduction, at a given load, can be calculated using the following equation:

$$\text{Percent torque reduction at given load} = \frac{(A_L - B_L)}{A_L} \times 100 \quad (E2)$$

Where $A_L$ = Torque meter reading of untreated mud (inch-pounds)

$B_L$ = Torque meter reading of treated mud (inch-pounds)

4. Effect of NPs on the Coefficient of Friction

The engineered NPs in drilling fluid reduced coefficient of friction and substantially increased lubricity as shown in Table 2.

TABLE 2

Coefficient of friction and % torque reduction in the presence and absence of NPs in drilling fluid (DF)

| Nanoparticles (NPs) & Conc. Used | Coefficient of friction | | | % torque reduction | |
| --- | --- | --- | --- | --- | --- |
| | DF without NPs (control) | DF with ex-situ NPs | DF with in-situ NPs | DF with ex-situ NPs | DF with in-situ NPs |
| Fe(OH)$_3$ (1 wt %) | 0.095 ± 0.002 | 0.081 ± 0.004 | 0.039 ± 0.002 | 14.73% | 58.94% |
| CaCO$_3$ (4 wt %) | 0.095 ± 0.002 | 0.093 ± 0.002 | 0.059 ± 0.006 | 2.1% | 37.89% |

It appears that in situ prepared NPs disperse better and communicate better with the mother drilling fluid as opposed to the ex situ prepared ones. Therefore, in situ prepared NPs may carry a proportion of the load benefiting the improvement of antiwear property more than NPs prepared ex situ. Thus using tailormade NPs in drilling fluid can reduce coefficient of friction and substantially increase lubricity. Improvement in lubricity reduces energy consumption, which, in turn, increases profitability.

Oil-based drilling fluids have the inherent advantage of significantly lower coefficients of friction (CoF). The typical CoF for an oil-based drilling fluid is 0.10 or less (metal to metal). In comparison, water has a CoF of 0.34 and the CoF of water-base drilling fluids typically ranges between 0.2 and 0.5 (Chang et al., 2011). Comparing between the typical oil based mud and NP-containing mud the friction mechanism is most likely a transfer of NPs to the counterface. This suggests that NPs in the contact zone act like ball bearings in the interface between the two surfaces. The small size allows the particles to penetrate into the surface and van der Waals forces ensure that the particles adhere to the surfaces. Regular lubricants, or oil as continuous phase, in drilling fluid can only form a single oil film whereas NPs in drilling fluid can create an additional ball bearings action leading to better lubrication effect.

Iron (III) hydroxide NPs perform better than calcium carbonate NPs. A few iron oxide magnetite structures produced during the preparation of iron oxide/hydroxide nanoparticles could possibly contribute to higher lubricity once captured in the surface within the drilling fluid. NaCl and NaNO$_3$ salts form as side products during the iron oxide/hydroxide and calcium carbonate NP-based fluid formulation. According to some literature (Scoggins and Ke, 2011; Ke and Foxenberg, 2010), sodium salts improve fluid lubricity. Table 3 shows that these side products, in fact, increase the coefficient of friction. Therefore, the increase in lubricity observed when iron-based and calcium-based NP-drilling fluids are used can be entirely attributed to the nanoparticles.

TABLE 3

Coefficient of friction and % torque reduction in the presence and absence of salts in drilling fluid (DF)

| Salt & Conc. Used | Coefficient of friction | | % torque reduction |
| --- | --- | --- | --- |
| | DF without salt (control) | DF with salt | |
| NaCl (1 wt %) | 0.0980 ± 0.002 | 0.100 ± 0.004 | −2% |
| NaNO$_3$ (1 wt %) | 0.0980 ± 0.002 | 0.110 ± 0.005 | −12% |

Nanosized particles are much more readily dispersible than micron-sized ones (Canter, 2009). When dispersed in a drilling fluid, minimum agglomeration and settling occur and a stable suspension form. The stable dispersion is also supported by the presence of surfactant molecules. Both in situ and ex situ prepared nanoparticles are so small in size that a stable colloidal dispersion in drilling fluids can be achieved which probably avoids the undesired precipitation caused by gravitation. With the formation of a stable well-proportioned dispersion, NPs are more prone to be trapped in the rubbing surface due to its excessive surface energy. Dispersed nanoparticles are deposited on the friction surface and sheared off nanoparticles trapped at the interface. Roughness of the surface may be reduced by the polishing effect (Wu et al, 2007; Mosleh et al., 2009). Moreover, the nanoparticles tend to be dispersed uniformly which would result in a more uniform contact stress between the contacting surfaces (Chang and Friedrich, 2010). Moshkovith et al. (2007) studied the lubricity properties of IF-WS$_2$ and also found dispersion impacts the lubricity performance as the dispersed NPs possess solid lubrication properties due to its stability. It was also found that aggregates size of NPs depend on the mixing time of dispersion. The NPs are engineered to have specific size ranges and shapes so that they can find their way into intricate spaces and maintain lamellar structure. It is therefore speculated that the coefficient of friction reduction is due to the surface boundary films provided by NPs that slide easily over one another like ball bearings. Similar findings have been reported in the literature on the effect of dispersing carbon and metallic-based NPs on tribological performance of lubricating oils (Ajay et al., 2008; Abdullah, 2008; Verma et al., 2008; Zhang et al., 2009). Specifically, a reduction in the coefficient of friction by over 25 percent was observed when adding nickel-based NPs to lubricants (Kostic, 2010).

In addition to reducing torque, higher lubricity also lowers the incidence of stuck pipe, which can significantly lower drilling efficiency. Estimation prepared by oil companies showed that stuck pipe while drilling costs more than $250 million each year (Q'Max Technical Bulletin #7). Minimizing friction and the ability to transfer the weight to the bit are very important factors in drilling highly deviated extended reach and horizontal wells. Moreover, reduction in torque in the presence of NPs signifies higher extended reach wells at a given torque and load on bit.

From the aforementioned discussion it can be pointed out that the ability of NPs to increase lubricity depends on the following features:
1. NPs can adsorb physically on any metal surface due to van der Waals forces.
2. The size of the NPs is so small that they can easily enter a macroscopic sliding contact.
3. The lubrication effect can be generated by the chemical nature of the surfactant as described by Yang et al. (2012) and NPs altogether or NPs alone. Dispersed nanoparticles help reduce agglomeration at the interface and hence, improve the co-efficient of friction. Surfactant can be used to improve the dispersion quality and stability.

4. Coefficient of friction is significantly reduced by NPs alone and salts produced as side products from the NPs formation have no impact on lubricity.

The NP additives are multifunctional. NPs-based lubricants can be used in automobile, lubricants, greases, metal working fluid, heavy machinery and other related industries. Standard laboratory tests indicated that NPs lowered both API and HTHP drilling fluid loss values. It can, also, improve the rheological property and lifting capacity. It has strong adsorption ability and can adhere to the wall and the string and thus improve lubricity. Addition of NPs enhances the load-bearing capacity of the lubricants, preserving the surfaces in direct contact and therefore increases the wear resistance.

6. References

Abdullah. S. F, "Nanoparticle (capped wolfram (VI) Oxide) as a additive in lubricant", ICCBT, 347-356, (2008)

Amanullah. M, Al-Arfaj. K. M, and Al-Abdullatif. Z, "Preliminary Test Results of Nano-based Drilling Fluids for Oil and Gas Field Application", SPE/AIDC 139534, 1-9, (2011)

Canter. N, "Boron nanotechnology-based lubricant additive", Tribology and lubrication technology, (2009)

Chang. Li, Friedrich. K, "Enhancement effect of nanoparticles on the sliding wear of short fiber-reinforced polymer composites: A critical discussion of wear mechanisms", Tribology International, 43, 2355-2364, (2010)

Husein. M, Zakaria. M. F, Hareland. G, "Novel nanobased drilling fluids to mitigate fluid loss" PCT Patent Application No: PCT/CA2012/050075, (2012)

Husein. M. M, Nassar. N. N, "Nanoparticles Preparation using the single microemulsion scheme", Current Nanoscience, 4, pp 370-380, (2008)

Hoskins. W. T, "Drilling fluid additive and method for improving lubricity or increasing rate of penetration in a drilling operation", US Patent Publication 2010/0204067 A1, (2010)

Javora. P. H, Qu. Q, "Well treatment fluids containing nanoparticles and methods of using same", US Patent Publication 2009/0082230A1, (2009)

Ke. M and Foxenberg. W, "Lubricity of brine completion and workover fluids", SPE/ICoTA 130679, 1-7, (2010)

Kercheville. J. D, Hinds. A. A, Clements. W. R, "Comparison of environmentally acceptable materials with diesel oil for drilling mud lubricity and spotting fluid formulations", IADC/SPE 14797, (1986)

Kostic. M, "Development of hybrid, tribological nanofluids with enhanced lubrication and surface-wear properties", www.kostic.niu.edu/DRnanofluids, (2010)

Krishna. R, Chandrakant R. P, Prabhakar S. P, Sairam K S. P., Craig R., Ricky C, Jiter C and Chad D. B, "Lost circulation compositions and associated method", US Patent Publication 2011/162845 (2011)

Lammons. A. D, "Field Use Documents Glass-bead Performance", Oil & Gas J. 82, No. 48, 109-111 (1984)

Malshe. P. A, Adhvaryu. A, Verma. A and McCluskey. H. P, "Nanoparticulate based lubricants", US Patent Publication 2008/0234149 A1 (2008)

Moshkovita. A, Perfiliev. V, Verdyan. A, Lapsker. I, Popovitz-Biro. R, Tenne. R and Rapoport. L, "Sedimentation of IF-WS$_2$ aggregates and a reproducibility of the tribological data", Tribological International, 40, 117-124, (2007)

Mosleh. M, Atnafu D. N, Belk H. J, Nobles M. O, "Modification of sheet metal forming fluids with dispersed nanoparticles for lubrication", Wear, 267, 1220-1225, (2009)

Ofite Lubricity Tester Instruction Manual, OFI Testing Equipment Inc, (2011)

Q'Max Technical Bulletin #7, "Differentially Stuck Pipe", Q'Max Solutions Inc

Qi. Q and Paul H. J, "Well treatment fluids containing nanoparticles and method of using same", US Patent Publication 2009/0082230 (2009)

Riley. M, Stamatakis. E, Young. S, Hoelsher P. K, Stefano D. G,"Wellbore stability in unconventional shale—the design of a nanoparticles fluid", SPE 153729, (2012)

Scoggins. C. W and Ke. M, "Method of increasing lubricity of brine-based drilling fluids and completion brines", U.S. Pat. No. 8,071,510 (2011)

Skalle. P, Backe. R. K, Lyomov. K. S, Kilaas. L, Dyrli. D. A and Sveen. J, "Microbeads as Lubricant in Drilling Muds Using a Modified Lubricity", SPE 56562, 1-7, (1999)

Tenne. R, Rapoport. L, Lvovsky. M, Feldman. Y and Leshchinsky. V, "Hollow fullerene-like nanoparticles as solid lubricants in composite metal matrices", U.S. Pat. No. 6,710,020 (2004)

WU. Y Y, Tsui. Wc, Tc. Liu, "Experimental analysis of tribological properties of lubricating oils with nanoparticles additive", Wear, 262, 819-825, (2007)

Yang. Z, Liu. Y, Zhao. X, Song. T, Yan. J, Jia. W, "Research and application of nanoscale emulsion lubricating material for drilling fluid in Daqing oil field", IADC/SPE 161899, 1-7, (2012)

Zakaria. M. F, Husein. M, Hareland. G, "Novel Nanoparticle Based Drilling Fluid with Improved Characteristics" presented at SPE International Conference on Oilfield Nanotechnology held in Noordwijk, The Netherlands on 12-14 Jun. 2012, SPE-156992-PP Zhang. M, Wang. X, Fu. X and Xia. Y, "Performance and anti-wear mechanism of $CaCO_3$ nanoparticles as a green additive in poly-alpha-olefin", Tribology International, 42, 1029-1039, (2009)

The above-described aspects are intended to be examples only. Alterations, modifications and variations can be effected to the particular example by those of skill in the art without departing from the scope, which is defined solely by the claims appended hereto.

The invention claimed is:

1. A method of treating a borehole comprising providing a well fluid including a base fluid containing an emulsifier; adding nanoparticles as a lubricity additive to the base fluid, wherein the nanoparticles are formed ex situ by the method of providing aqueous-based precursor solutions for forming the nanoparticles, mixing the precursor solutions under high shear and adding the mixed precursor solutions to the base fluid, to form the nanoparticle-containing fluid, wherein the nanoparticles have a particle size between about 1 and 120 nm, and wherein the nanoparticles are present in an amount of about 5 wt % or less; and injecting the fluid into the well, for treating the well.

2. The method of claim 1 wherein the well fluid is a drilling fluid.

3. The method of claim 1 wherein the base fluid comprises an aqueous base fluid or an invert emulsion base fluid.

4. The method of claim 1 wherein the nanoparticles are present in an amount of between 0.1 wt % and 4 wt %.

5. The method of claim 1 wherein the nanoparticles are present in an amount of between 1wt % to 4wt %.

6. The method of claim 1 wherein the nanoparticles have a particle size between about 1 and 30 nm.

7. The method of claim 1 wherein the aqueous-based precursor solutions comprise:
 a. an aqueous based solution containing $FeCl_{3(aq)}$ and an aqueous based solution containing $NaOH_{(aq)}$;
 b. an aqueous-based solution containing $Ca(NO)_3$ and an aqueous based solution containing $Na_2CO_3$;
 c. an aqueous-based solution containing $BaCl_2$ and an aqueous based solution containing $Na_2SO_4$; or
 d. an aqueous-based solution containing $Na_2S$ and an aqueous based solution containing $FeCl_2$.

8. The method of claim 1 wherein the nanoparticles are selected from the group consisting of metal hydroxide, metal oxide, metal carbonate, metal sulfide, metal sulfate, and a mixture thereof.

9. The method of claim 8 wherein the nanoparticles are iron (III) hydroxide.

10. The method of claim 8 wherein the nanoparticles are selected from the group consisting of iron hydroxide, iron oxide, calcium carbonate, iron sulfide, barium sulfate and a mixture thereof.

11. The method of claim 10 wherein the nanoparticles are iron oxide formed from iron hydroxides in high pressure high temperature conditions in the underground formation.

12. A method of treating a borehole comprising providing a well fluid including a base fluid containing an emulsifier; adding nanoparticles as a lubricity additive to the base fluid, wherein the nanoparticles are formed in situ in the fluid by the method of i) providing powder precursor salts for forming the nanoparticles, adding the powder precursor salts to the base fluid and subjecting the fluid to mixing and shear to form the nanoparticle-containing fluid, or ii) providing aqueous-based precursor solutions for forming the nanoparticles, adding the precursor solutions to the base fluid, and subjecting the fluid to mixing and shear to form the nanoparticle-containing fluid, wherein the nanoparticles have a particle size between about 1 and 120 nm, and wherein the nanoparticles are present in an amount of about 5 wt % or less; and injecting the fluid into the well, for treating the well.

13. The method of claim 12 wherein the aqueous-based precursor solutions comprise:
 a. an aqueous based solution containing $FeCl_{3(aq)}$ and an aqueous based solution containing $NaOH_{(aq)}$;
 b. an aqueous-based solution containing $Ca(NO)_3$ and an aqueous based solution containing $Na_2CO_3$;
 c. an aqueous-based solution containing $BaCl_2$ and an aqueous based solution containing $Na_2SO_4$; or
 d. an aqueous-based solution containing $Na_2S$ and an aqueous based solution containing $FeCl_2$.

14. The method of claim 12 wherein the well fluid is a drilling fluid.

15. The method of claim 12 wherein the base fluid comprises an aqueous base fluid or an invert emulsion base fluid.

16. The method of claim 12 wherein the nanoparticles are present in an amount of between 0.1 wt % and 4 wt %.

17. The method of claim 16 wherein the nanoparticles are present in an amount of between 1wt % to 4wt %.

18. The method of claim 12 wherein the nanoparticles have a particle size between about 1 and 30 nm.

19. The method of claim 12 wherein the nanoparticles are selected from the group consisting of metal hydroxide, metal oxide, metal carbonate, metal sulfide, metal sulfate, and a mixture thereof.

20. The method of claim 19 wherein the nanoparticles are selected from the group consisting of iron hydroxide, iron oxide, calcium carbonate, iron sulfide, barium sulfate and a mixture thereof.

21. The method of claim 20 wherein the nanoparticles are iron oxide formed from iron hydroxide in high pressure high temperature conditions in the underground formation.

22. The method of claim 20 wherein the nanoparticles are iron (III) hydroxide.

* * * * *